United States Patent
Tsumura

(10) Patent No.: US 6,912,259 B1
(45) Date of Patent: Jun. 28, 2005

(54) INTERPOLATION SYNCHRONOUS DETECTION METHOD AND RADIO COMMUNICATION SYSTEM

(75) Inventor: Soichi Tsumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,289

(22) Filed: Sep. 2, 1999

(30) Foreign Application Priority Data

Sep. 3, 1998 (JP) .......................................... 10/249559

(51) Int. Cl.$^7$ ............................................ H04B 1/707
(52) U.S. Cl. .................................................. 375/354
(58) Field of Search ................................ 375/354, 130, 375/147, 345, 316, 371

(56) References Cited

U.S. PATENT DOCUMENTS

| | | | | |
|---|---|---|---|---|
| 5,375,146 A | * | 12/1994 | Chalmers | ..................... 375/350 |
| 5,537,419 A | | 7/1996 | Parr et al. | ..................... 370/100 |
| 5,692,015 A | * | 11/1997 | Higashi et al. | ............. 375/340 |
| 5,822,364 A | * | 10/1998 | Yamada et al. | ............. 375/147 |
| 6,178,194 B1 | * | 1/2001 | Vasic | ......................... 375/136 |
| 6,351,458 B2 | * | 2/2002 | Miya et al. | ................. 370/330 |

FOREIGN PATENT DOCUMENTS

| | | |
|---|---|---|
| EP | 0535403 | 4/1993 |
| EP | 0802656 | 10/1997 |
| WO | WO 91/20142 | 12/1991 |

* cited by examiner

*Primary Examiner*—Kevin Burd
(74) *Attorney, Agent, or Firm*—Dickstein, Shapiro, Morin & Oshinksy, LLP.

(57) ABSTRACT

In an interpolation synchronous detection method in a radio communication system in which a pilot symbol whose phase point is known is periodically inserted in an information signal to allow interpolation synchronous detection on a receiving side, synchronous detection of the information between the pilot symbols is performed by linearly interpolating a transfer function estimated from the pilot symbols respectively located before and after the information signal, and a reception sampling point timing used for the synchronous detection is updated at the middle point between the pilot symbols respectively located before and after the information signal. A radio communication system is also disclosed.

8 Claims, 3 Drawing Sheets

INTERPOLATION SYNCHRONOUS DETECTION METHOD AND RADIO COMMUNICATION SYSTEM

BACKGROUND OF THE INVENTION

1. Field of the Invention

The present invention relates to a pilot interpolation synchronous detection method for a transmission circuit in a radio communication system and, more particularly, to an interpolation synchronous detection method and radio communication system which can be used for, for example, a pilot interpolation synchronous detection spread spectrum scheme.

2. Description of the Prior Art

Recently, a pilot interpolation synchronous detection spread spectrum scheme has been proposed as one of the mobile communication schemes in RCS 94-98 "Characteristics of Interpolation Synchronous Detection RAKE in DS-CDMA" by ARIB (Association of Radio Industries and Businesses).

In pilot interpolation synchronous detection, first and second pilot signals whose phase points are known are cyclically or periodically inserted in an information signal to form a frame, and a transmission path that varies due to multipath Rayleigh fading is estimated in the interval between the first and second known pilot signals. Letting Z1 and Z2 be the coefficients (transfer functions) estimated from the first and second known pilot signals, a coefficient (transfer function) Z(k) which is obtained by estimating a transmission path at the kth symbol of N symbols of the information signal can be obtained by primary interpolation of coefficients Z1 and Z2 of the first and second known signals as per:

$$Z(k)=[(N-k)/N]Z1;[k/N]Z2 \quad (1)$$

Furthermore, kth demodulated data Sk obtained upon pilot interpolation synchronous detection is the product sum from i=1 to i=p expressed as:

$$Sk=[\alpha i \times Z^*i,k^* \times ri,k] \quad (2)$$

where p is the number of delayed waves to be subjected to RAKE reception, αi is the weighting coefficient for the ith delayed wave, $Z^*i,k^*$ is the complex conjugate of the coefficient phase estimated and primarily interpolated by interpolating the ith delayed wave estimated on the basis of the coefficients Z1 and Z2 estimated with respect to the ith delayed wave, and ri,k is the signal obtained by despreading each reception signal of the ith delayed wave.

When the multipath influences can be isolated from each other by despreading in this manner, interpolation synchronous detection using known symbols can be performed for each despread signal before RAKE synthesis, as indicated by equation (2).

If the multipath delay difference is larger than ±1 chip which is a delay difference allowing isolation of multipath influences by despreading, synchronous detection can be performed for each transmission path by interpolation synchronous detection. If, however, the multipath delay difference is smaller than ±1 chip which is the minimum difference allowing isolation of multipath influences by despreading, it is difficult to perform interpolation synchronous detection using known symbols for each despread symbol for the following reason. Even if the delay difference is small, the influences of different transmission paths are independent. Basically, therefore, transmission path estimation must be performed independently.

In practice, multipath signals having a delay difference within ±1 chip are received on the receiving side with intersymbol interference, and it is generally difficult to remove the influences of the interference as in general radio communication schemes, other than the spread spectrum communication scheme, in which the influences of transmission path distortion due to multipath transmission cannot be removed.

For this reason, when despreading and interpolation synchronous detection are to be performed by selecting one optimal reception sampling point (e.g., a sampling point at which the eye pattern of a reception signal opens most) in predetermined cycles from the reception signals oversampled at n points (four points a to d in the following case), if there are transmission paths exhibiting a delay difference within ±1 chip, the reception sampling point to be selected changes. In addition, since the influences of transmission paths at the respective reception sampling points can be regarded as independent, interpolation synchronous detection may not be properly performed.

Furthermore, in a radio communication system, the reception signal power dynamic range is generally very large. A reception section in a terminal radio communication unit, in particular, uses a method of realizing a large dynamic range by combining a gain control section whose gain changes stepwise and a gain control section whose gain continuously changes. In this case, the gain of the overall reception section can be continuously changed in a wide range by a kind of amplitude range switching operation.

When the gain is continuously changed, the phase rotation amount of a reception signal in a receiver may undergo a discontinuous change at a point at which range switching is performed by switching the gain control section whose gain changes stepwise. This may make it impossible to perform normal interpolation synchronous detection as in the case described above in which despreading and interpolation synchronous detection are performed by selecting one optimal reception sampling point (e.g., a sampling point at which the eye pattern of a reception signal opens most) in predetermined cycles from the reception signals oversampled at n points. The above description has been made by taking gain changes in the reception section as an example. Obviously, however, this applies to the transmission section on the other party.

The above problems will be described in detail below with reference to FIGS. 1A to 1C. FIG. 1A shows a frame configuration of reception signal frames each containing a pilot symbol for interpolation synchronous detection and the timing of oversampling. In this case, quadrature oversampling is performed at points a, b, c, and d. FIG. 1B shows the timing at which an optimal sampling point for demodulation (e.g., a sampling point at which the reception eye pattern opens most) is selected from the points at which quadrature oversampling is performed. FIG. 1C shows the transition of a reference phase point with respect to each sampling point. Referring to FIG. 1C, a straight line passing through points q and s represents a reference phase transition at the sampling point c, and a straight light passing through points r and t represents a reference phase transition at the sampling point b. A difference Φ between these straight lines with respect to the ordinate (phase) represents the relative phase difference between a path that reaches the reception section at the timing corresponding to the sampling point b and a path that reaches the reception section at the timing corresponding to the sampling point c.

Assume that the optimal sampling timing for demodulation changes from b to c to b. In this case, in the prior art, as shown in FIG. 1B, since the sampling timing is updated immediately before (or after) a pilot symbol, the reference phases measured at the respective update timings are represented by p, q, and t.

In addition, since interpolation synchronous detection is performed, the transition of an estimated reference phase between pilot symbols is expressed by line segments p–q and q–t. In this case, the phase transition at the actual sampling point is represented by line segments p–r and q–s. Consequently, the integral value of estimated reference phase errors can be calculated from the areas of triangles prq and qst, each of which is given by $$(1/2) \cdot \Phi \cdot L$$

Therefore, this area matches with an error component, and an error in a linearly interpolated estimated transfer function increases, resulting in a deterioration in the accuracy of demodulated data.

The above description is about the spread spectrum communication scheme. However, this applies to an interpolation synchronous communication system other than the spread spectrum communication scheme except for despreading processing.

SUMMARY OF THE INVENTION

The present invention has been made in consideration of the above situation, and has as its object to provide an interpolation synchronous detection method which minimizes transfer function errors in a transmission path system by reducing the integral value of estimated reference phase errors in a transmission/reception section, thereby improving the accuracy of demodulated data, and a radio communication system which implements the method.

In order to achieve the above object, according to the first aspect of the present invention, there is provided an interpolation synchronous detection method in a radio communication system in which a pilot symbol whose phase point is known is periodically inserted in an information signal to allow interpolation synchronous detection on a receiving side, wherein synchronous detection of the information between the pilot symbols is performed by linearly interpolating a transfer function estimated from the pilot symbols respectively located before and after the information signal, and a reception sampling point timing used for the synchronous detection is updated at a middle point between the pilot symbols respectively located before and after the information signal.

According to the second aspect of the present invention, there is provided an interpolation synchronous detection method in a radio communication system in which a pilot symbol whose phase point is known is periodically inserted in an information signal to allow interpolation synchronous detection on a receiving side, wherein when gain control is performed stepwise on a transmission/reception section used in the radio communication system, the gain control is performed at a middle point between the pilot symbols respectively located before and after the information signal.

According to the third aspect of the present invention, there is provided a radio communication system in which pilot symbols whose phase points are known are periodically inserted in two ends of an information signal having predetermined bits to allow interpolation synchronous detection on a receiving side, comprising interpolation means for performing synchronous detection of the information signal between the pilot symbols by linearly interpolating a transfer function estimated from the pilot symbols respectively located before and after the information signal on the receiving side, means for performing interpolation synchronous detection by using a complex conjugate of the linearly interpolated transfer function, and processing means for selecting a sampling point, at a middle point between the pilot symbols, at which an eye pattern opens most from a result obtained by discretely oversampling the reception signal, thereby demodulating the reception signal.

According to the fourth aspect of the present invention, there is provided a radio communication system in which pilot symbols whose phase points are known are periodically inserted in two ends of an information signal having predetermined bits to allow interpolation synchronous detection on a receiving side, comprising a transfer function changing section for changing a transfer function of a transmission/reception section in the radio communication system stepwise, and a transfer function control section for changing a transfer function of the transfer function changing section at a middle point between the pilot symbols.

According to the fifth aspect of the present invention, the transfer function changing section and transfer function control section respectively comprise a gain changing section capable of switching a variable gain range and a gain control section.

According to the present invention, when interpolation synchronous detection is to be performed by using pilot symbols, there is a correlation between an estimated reference phase error and a demodulation error. That is, the smaller the estimated reference phase error, the smaller the demodulation error. For this reason, synchronous detection of the information signal between pilot symbols is performed by linearly interpolating the transfer function estimated from the pilot symbols respectively located before and after the information signal, and the reception sampling point timing used for synchronous detection at a middle point between the pilot symbols respectively located before and after the information signal is updated, thereby minimizing the reproduced data error rate.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENTS

Several preferred embodiments of the present invention will be described below with reference to the accompanying drawings.

Figure 2:
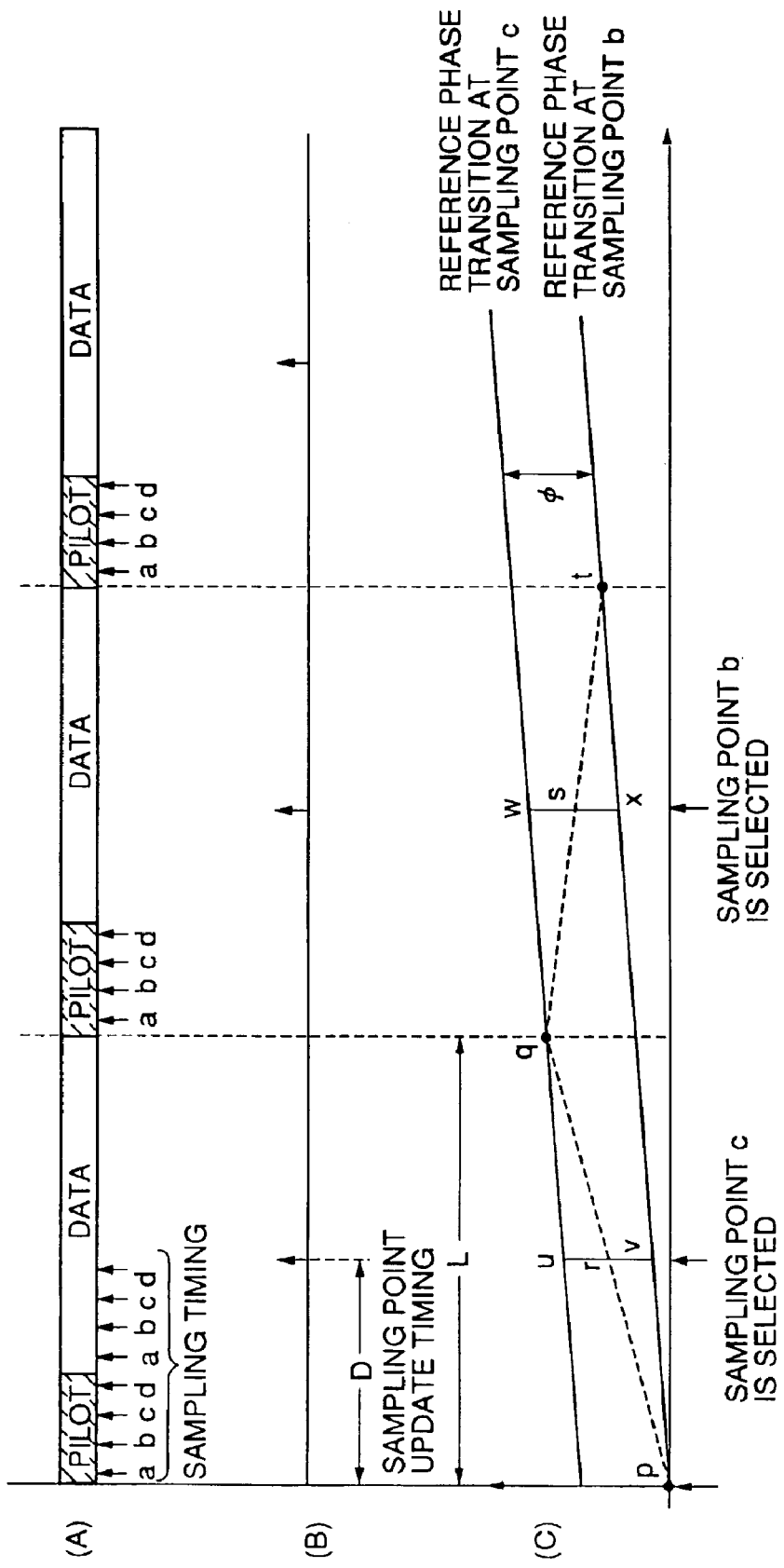
FIGS. 2A to 2C are graphs respectively showing a frame configuration of reception signal frames each containing pilot symbol for interpolation synchronous detection, the update timing of sampling for synchronous detection in an embodiment of the present invention, and the error of the transfer function estimated by linear interpolation with respect to a reference phase (for synchronous detection) at this time.

FIG. 2A shows a frame configuration of reception signal frames each containing pilot symbol for interpolation synchronous detection and the timings at which the frames are oversampled. In this case, quadrature oversampling is performed at points a, b, c, and d. FIG. 2B shows the timing at which an optimal sampling point for demodulation (e.g., the reception eye pattern opens most) is selected again from the points at which quadrature oversampling was performed. FIG. 2C shows the transition of a reference phase point from each sampling point, in which the straight line passing through points u and w represents a reference position transition at the sampling point c, and the straight line passing through points v and x represent a reference phase transition at the sampling point b. A difference Φ between these straight lines with respect to the ordinate (phase) represents the relative phase difference between a path that reaches the reception section at the timing corresponding to the sampling point b and a path that the reception section at the timing corresponding to the sampling point c.

Assume that the optimal sampling timing for demodulation changes from b to c to b. In the present invention, the sampling timing is updated when it departs from a time point immediately before a pilot symbol by D, unlike the case shown in FIG. 1B. In this case, the reference phases measured at the respective updated timings are represented by p, q, and t.

In addition, since interpolation synchronous detection is performed, the transition of an estimated reference phase between pilot symbols is expressed by line segments p–q and q–t. The phase transition at the actual sampling point is expressed by line segments p–v, u–q, q–w, and x–t. The integral value of estimated reference phase errors can be calculated from the sum of the areas of triangles pvr and ruq, and the sum of the areas of triangles qws and sxt. Letting Φ be the relative phase difference between a path that is indicated by pvxt corresponding to the sampling point b and reaches the reception section and a path that is indicated by uqw corresponding to the sampling point c and reaches the reception section, and L be the 1-frame interval corresponding to a pilot and data, the integral value of the respective estimated reference phase errors is given by $$(1/2) \cdot \{(\Phi/L) \cdot D \cdot D + (\Phi/L) \cdot (L-D) \cdot (L-D)\}$$

These triangles have minimum areas when D=L/2, and the area as the integral value of estimated reference phase errors at this time is given by $$(1/4) \cdot \Phi \cdot L$$

That is, the error between a reference phase (transfer function) estimated by linear interpolation and a true reference phase can be minimized by changing the sampling point to be selected at a middle time between pilot symbols.

This applies to a change in transfer function inside the reception section at an arbitrary point. More specifically, when the transfer function in the reception section is discretely changed, e.g., the gain range of the reception section is switched stepwise, the reference phase also changes discretely. As is obvious from the above description about the case wherein the sampling point to be selected is changed, the estimated reference phase error can be minimized by changing the sampling point at the middle time point between pilot symbols even in the case wherein the transfer function in the reception section is discretely changed (e.g., the gain range is switched stepwise). Furthermore, evidently, this can applied to even a case wherein the transfer function in the transmission section must be discretely changed.

This operation will be simply described by using equations. A transfer function Z(k) estimated by the communication system can be obtained by primary interpolation as linear interpolation:

$$Z(k)=[(N-k)/N]Z1+[k/N]Z2 \qquad (3)$$

where Z1 and Z2 are the transfer functions of pilot signals having first and second predetermined patterns. In this case, each pilot signal is an information signal consisting of N symbols, and the propagation path at the kth symbol is estimated.

In this manner, kth demodulated data Sk after pilot interpolation synchronous detection is the product sum from i=1 to i=p as per:

$$Sk=[\alpha i \times Z^*i,k^* \times ri,k] \qquad (4)$$

Hence, accurate demodulated data can be output.

Note that equation (4) is associated with propagation in the spread spectrum scheme, in which equation, p is the number of delayed waves subjected to RAKE reception, $\alpha i$ is the weighting coefficient for the ith delayed wave, $Z^*i,k^*$ is the complex conjugate of the coefficient phase estimated and primarily interpolated by interpolating the ith delayed wave estimated on the basis of the transfer functions Z1 and Z2 estimated with respect to the ith delayed wave, and ri,k is the signal obtained by despreading each reception signal of the ith delayed wave.

In this manner, the transmission error can be minimized by discretely changing the transfer functions in the transmitting and reception sections of the radio communication system at the middle time point between pilot symbols.

Figure 3:
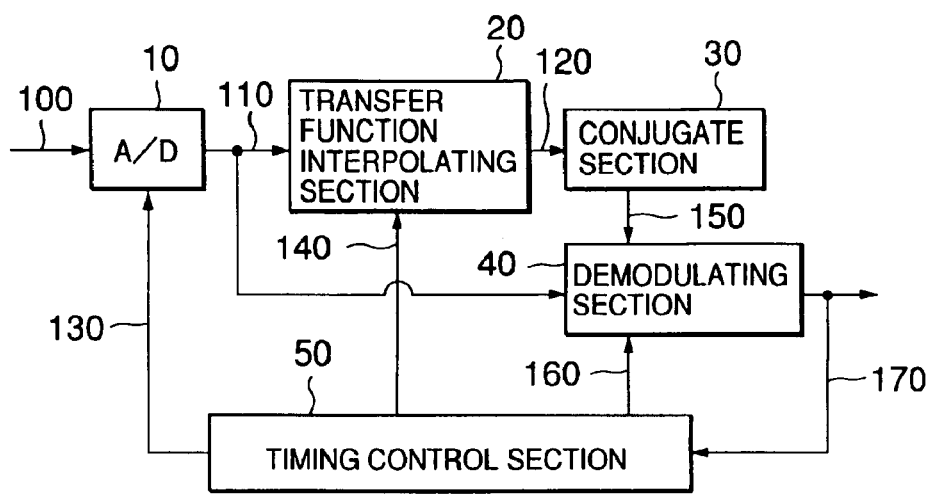
FIG. 3 is a block diagram showing the arrangement of the main part of the first embodiment associated with a reception unit for implementing a pilot interpolation synchronous detection scheme according to the present invention.

FIG. 3 shows the first embodiment of the present invention. Referring to FIG. 3, a transmission section (not shown) modulates, at a transmission modulation stage, the data of a reception baseband signal 100 input to an A/D converter 10 which is to be transmitted according to a modulation scheme such as BPSK, QPSK, FSK, or QAM. The modulated signal is converted into an RF signal and power-amplified to be radiated from an antenna. The radiated transmission signal is received by the reception antenna of a mobile unit or base station through a plurality of spatial transmission paths. The received signal is then converted into a reception baseband signal by a reception section through an RF amplification stage, band-pass filter, mixer, IF amplification stage, and the baseband demodulation stage of a detection means. In this reception baseband signal 100, therefore, the transfer function becomes complicated through paths from the transmission modulation stage to the baseband demodulation stage according to the respective transmission systems. In addition, if a mobile unit is included, since its transfer function incessantly changes, the estimated transfer function of each symbol is obtained on the basis of pilot signals having a predetermined pattern and located on two sides of each of a plurality of symbols, and the optimal sampling timing is changed from b to c to b, as shown in FIGS. 2A to 2C.

Referring to FIG. 3, the reception baseband signal 100 is converted into a digital baseband signal 110 by the A/D converter 10 under the above environment. The digital baseband signal 110 is then input to a transfer function interpolating section 20 and demodulating section 40. The transfer function interpolating section 20 uses the pilot portion contained in the input digital baseband signal 110 to estimate transfer functions up to the section 20 by interpolation processing, and outputs an estimated transfer function 120. The estimated transfer function 120 is further converted into a complex conjugate signal 150 by a conjugate section 30. Meanwhile, the demodulating section 40 cancels the influence of the transmission path transfer function by using the digital baseband signal 110 and complex conjugate signal 150, and outputs a demodulation result 170. A timing control section 50 controls the operation of each component by outputting a sampling timing control signal 130, interpolation control signal 140, and demodulating section control signal 160. At this time, the timing control section 50 implements sampling point updating operation described with reference to FIGS. 2A to 2C by using the interpolation control signal 140 and sampling timing control signal 130.

Note that interpolation synchronous detection is implemented by the transfer function interpolating section 20, conjugate section 30, and demodulating section 40, and an interpolation means indicates a transfer function interpolating section. In addition, a reception sampling point timing is updated by mainly updating the exclusive OR 103 supplied to the A/D converter 10 and also updating the interpolation control signal 140 and demodulating section control signal 160.

Furthermore, the transfer function estimated by the transfer function interpolating section 20 is changed stepwise because it is difficult to continuously change the transfer function linearly in practice. This operation indicates that the transfer function is linearly changed from 0 dB to 20 dB, the base is then raised to linearly change the transfer function from 20 dB to 40 dB, and the transfer function is sequentially changed to 60 dB, 80 dB, and the like. In addition, changing the transfer functions of the transmission and reception circuits and transmitting and reception sections stepwise amounts to changing estimated transfer functions by changing the gain, phase, or the like of the reception RF amplifier having a through circuit stepwise by ON/OFF-operating the power supply within a transmission path system up to a reception baseband signal.

Figure 1:
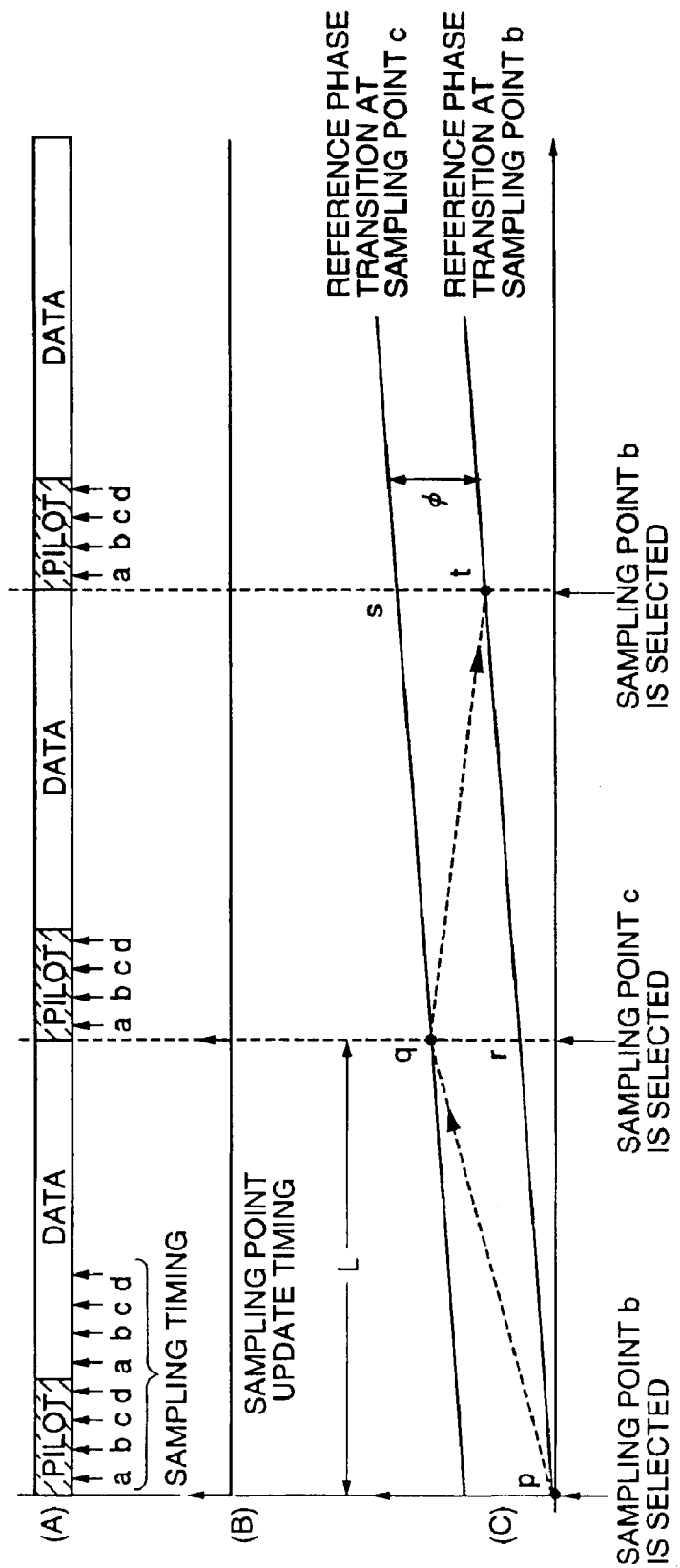
FIGS. 1A to 1C are graphs respectively showing a frame configuration of reception signal frames each containing pilot symbol for interpolation synchronous detection, the update timing of sampling for synchronous detection in the prior art, and the error of the transfer function estimated by linear interpolation with respect to a reference phase (for synchronous detection) at this time.

In the first embodiment described above, the error probability is very low as compared with the prior art in which the estimated transfer function according to the sampling points b and c is updated at the start point of the pilot signal or the end point of the subsequent pilot signal as described with reference to FIGS. 1A to 1C.

Figure 4:
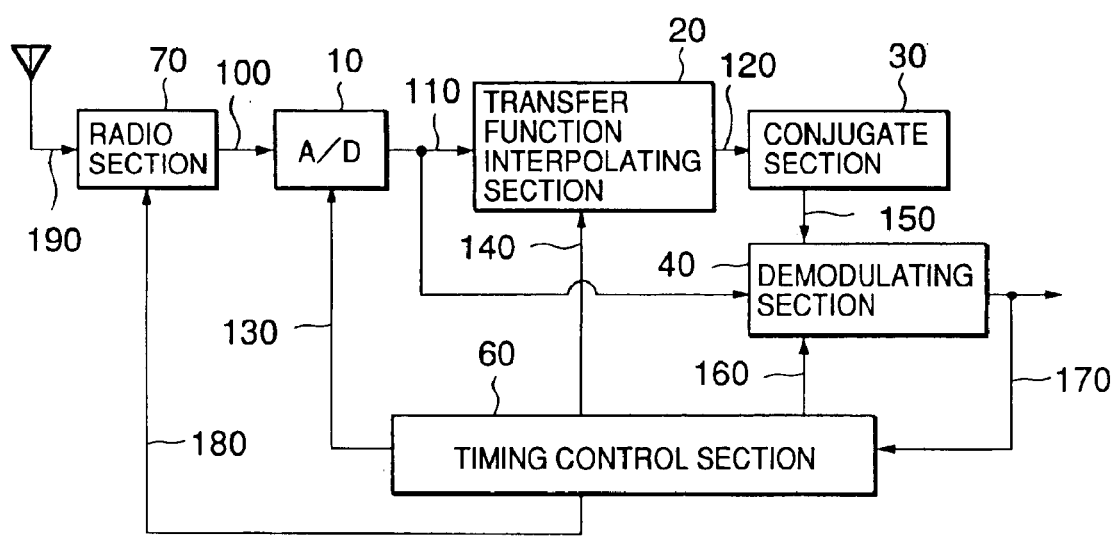
FIG. 4 is a block diagram showing the arrangement of the main part of the second embodiment associated with a reception unit for implementing the pilot interpolation synchronous detection scheme according to the present invention.

FIG. 4 shows the arrangement of a reception section in a communication system according to the second embodiment of the present invention. Referring to FIG. 4, a reception signal 190 received from an antenna is input to a radio section 70. A transmission section in a mobile unit or base station (not shown) modulates, at a transmission modulation stage, the data to be transmitted according to a modulation scheme such as BPSK, QPSK, FSK, or QAM. The modulated signal is converted into an RF signal, power-amplified, and radiated from the antenna. The radiated transmission signal is received by the reception antenna of a mobile unit or base station through a plurality of spatial transmission paths. As a consequence, the reception signal 190 is obtained. The radio section 70 includes an RF amplification stage, band-pass filter, local oscillator, frequency conversion mixer, IF amplification stage, and baseband demodulation stage as a detection means. The output from the baseband demodulation is the reception baseband signal.

In a reception baseband signal 100 output from the radio section 70, the transfer function becomes complicated through paths from the transmission modulation stage to the baseband demodulation stage according to the respective transmission systems. In addition, if a mobile unit is included, since its transfer function incessantly changes, the estimated transfer function of each symbol is obtained on the receiving side having a predetermined pattern on the basis of pilot signals having a predetermined pattern and located on two sides of each of a plurality of symbols, and the optimal sampling timing is changed from b to c to b, as shown in FIGS. 2A to 2C.

In this case, the reception baseband signal 100 is converted into a digital baseband signal 110 by the A/D converter 10. The digital baseband signal 110 is then input to a transfer function interpolating section 20 and demodulating section 40. The transfer function interpolating section 20 uses the pilot portion contained in the input digital baseband signal 110 to estimate transfer functions up to the section 20, e.g., transfer functions Z1 and Z2 of equation (3) described above by interpolation processing, and outputs an estimated transfer function 120. The estimated transfer function 120 is further converted into a complex conjugate signal 150 by a conjugate section 30.

Meanwhile, the demodulating section 40 cancels the influence of the transmission path transfer function by using the digital baseband signal 110 and complex conjugate signal 150, and outputs a demodulation result 170 that coincides with the transmission data.

The timing control section 60 controls the operation of each component by outputting a sampling timing control signal 130, interpolation control signal 140, and demodulating section control signal 160. The timing control section 60 also controls the radio section 70 by using a radio section control signal 180. At this time, the timing control section 60 implements the sampling point updating operation described with reference to FIGS. 2A to 2C by using the interpolation control signal 140 for the transfer function interpolating section 20 and the sampling timing control signal 130 for the A/D converter 10. At the same timing, the timing control section 60 switches the variable gain range of a gain control section included in the radio section 70, as needed.

The gain control section included in the radio section 70 includes a matching unit for impedance-matching with the antenna, a variable attenuator for adjusting the signal level, an RF amplification section capable of changing the gain, a variable band-pass filter capable of changing the reception band width, an IF amplification section capable of changing the gain, and the like. This gain control section can change the gain range and/or the phase characteristics by applying the radio section control signal 180 to any one of the above components.

What is claimed is:

1. An interpolation synchronous detection method in a radio communication system in which a pilot symbol whose phase point is known is periodically inserted in an information signal to allow interpolation synchronous detection on a receiving side, comprising:

synchronous detection of the information between the pilot symbols, contained only in a received signal, by linearly interpolating a transfer function estimated from the pilot symbols respectively located before and after the information signal, and a reception sampling point timing used for the synchronous detection is updated at a middle point between the pilot symbols respectively located before and after the information signal, wherein oversampling occurs at the sampling point that coincides with a maximum eye pattern between the pilot symbols and phase error is minimized by changing the transfer function at the sampling point.

2. An interpolation synchronous detection method in a radio communication system in which a pilot symbol, contained in a received signal, whose phase point is known is periodically inserted in an information signal to allow interpolation synchronous detection on a receiving side, comprising:

using a transfer function wherein when said transfer function of a transmission/reception circuit used in said radio communication system is changed stepwise, the transfer function of said transmission/reception circuit is changed at a middle point between the pilot symbols, contained only in the received signal, respectively located before and after the information signal, wherein oversampling occurs at the middle point coincides with a maximum eye pattern between the pilot symbols and phase error is minimized by changing the transfer function at the sampling point.

3. A method according to claim 2, wherein the transfer function is changed stepwise by switching a gain range of a transmission/reception section used in said radio communication system.

4. A radio communication system in which pilot symbols whose phase points are known are periodically inserted in two ends of an information signal having predetermined bits to allow interpolation synchronous detection on a receiving side, comprising:

interpolation means for performing synchronous detection of the information signal between the pilot symbols, contained only in a received signal, by linearly interpolating a transfer function estimated from the pilot symbols respectively located before and after the information signal on the receiving side;

means for performing interpolation synchronous detection by using a complex conjugate of the linearly interpolated transfer function; and processing means for selecting a sampling point, at a middle point between the pilot symbols, at which an eye pattern opens most from a result obtained by discretely oversampling the reception signal, thereby demodulating the reception signal, wherein the oversampling point coincides with a maximum eye pattern between the pilot symbols and phase error is minimized by changing the transfer function at the sampling point.

5. A radio communication system in which pilot symbols, contained only in a received signal, whose phase points are known are periodically inserted in two ends of an information signal having predetermined bits to allow interpolation synchronous detection on a receiving side, comprising:

a transfer function changing section for changing a transfer function of a transmission/reception section in said radio communication system stepwise; and a transfer function control section for changing a transfer function of said transfer function changing section at a middle point between the pilot symbols, contained in the received signal wherein the midpoint coincides with a maximum eye pattern and phase error is minimized by changing the transfer function at the sampling point.

6. A system according to claim 5, wherein said transfer function changing section comprises a gain changing section capable of switching a variable gain range, and said transfer function control section comprises a gain control section.

7. A radio communication system in which pilot symbols whose phase points are known are periodically inserted in two ends of an information signal having predetermined bits to allow interpolation synchronous detection on a receiving side, comprising:

an interpolator performing synchronous detection of the information signal between the pilot symbols, contained in a received signal, by linearly interpolating a transfer function estimated from the pilot symbols respectively located before and after the information signal on the receiving side;

an interpolator performing synchronous detection by using a complex conjugate of the linearly interpolated transfer function; and a processor for selecting an oversampling point, at a middle point between the pilot symbols, coinciding with a point between the pilot symbols at which an eye pattern opens most from a result obtained by discretely oversampling the reception signal, thereby demodulating the reception signal wherein phase error is minimized by changing the transfer function at the sampling point.

8. A method of performing interpolation synchronous detection using pilot symbols comprising:

linearly interpolating a transfer function estimated from the pilot symbols, the pilot symbols located before and after an information signal;

sampling at an oversampling timing point for synchronous detection at a middle point between the pilot symbols, the sampling point being dynamically updated based on the linear interpolation of the transfer function estimated from the pilot symbols, wherein a reference phase error and a reproduced data error rate are minimized wherein the oversampling point coincides with a maximum eye pattern between the pilot symbols and phase error is minimized by changing the transfer function at the sampling point.

\* \* \* \* \*